Feb. 9, 1971  J. A. BENEKE  3,561,279

PLURAL SPEED TRANSMISSION SYSTEM

Filed Nov. 4, 1968  3 Sheets-Sheet 1

INVENTOR
JENE A. BENEKE

Richards, Harris & Hubbard
ATTORNEY

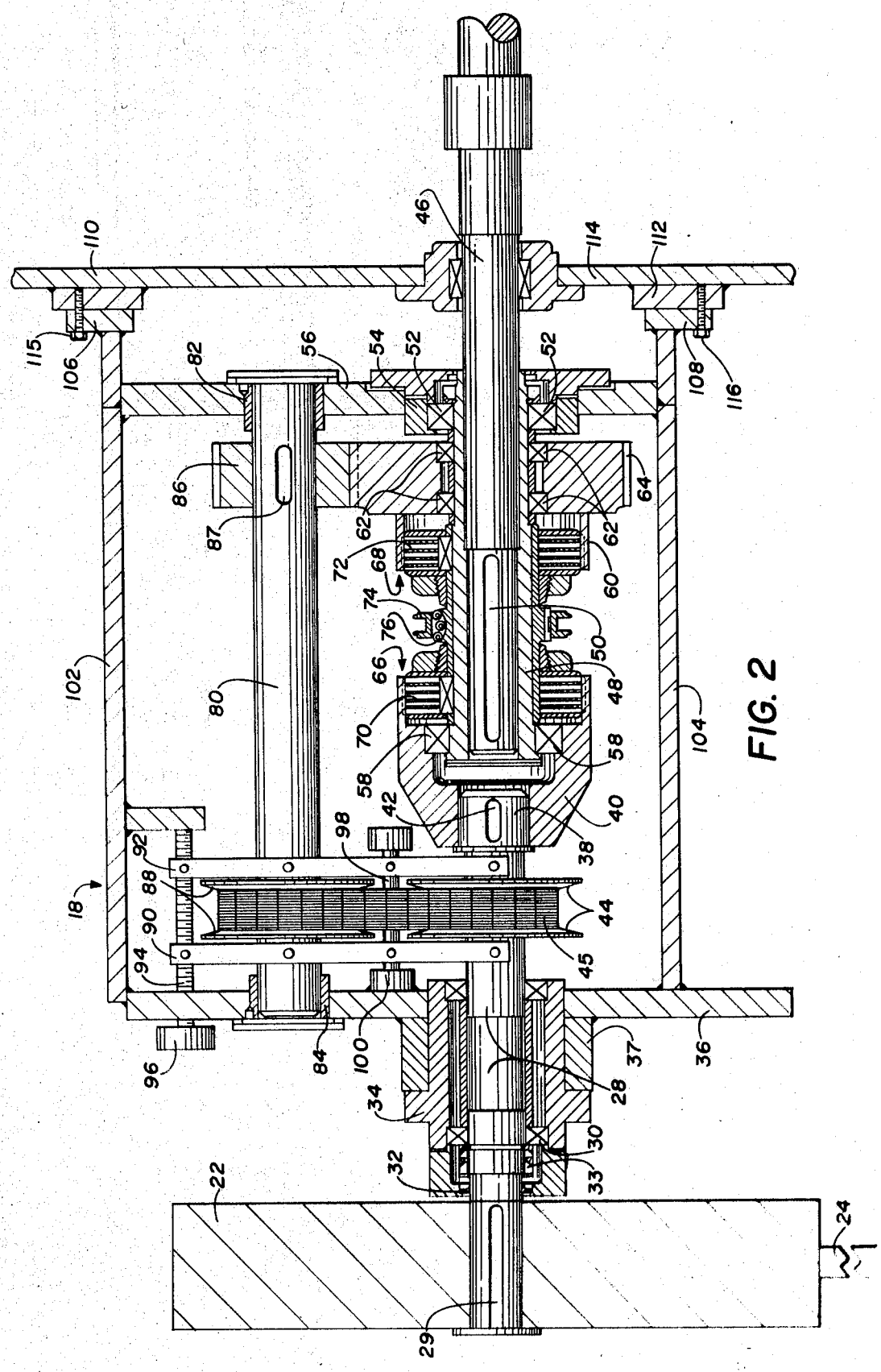

United States Patent Office 3,561,279
Patented Feb. 9, 1971

3,561,279
PLURAL SPEED TRANSMISSION SYSTEM
Jene Arnold Beneke, Dallas, Tex., assignor to Verson Manufacturing Company, Dallas, Tex., a corporation of Texas
Filed Nov. 4, 1968, Ser. No. 773,140
Int. Cl. F16h 3/08
U.S. Cl. 74—360                                    5 Claims

ABSTRACT OF THE DISCLOSURE

The plural speed mechanical transmission system includes a driving shaft rotated at a first speed by a flywheel and a driven shaft coaxially lined with the driving shaft. Clutches having two energized states are disposed adjacent the ends of the shafts, with the clutches operable in a first state to connect ends of the shafts for rotation of the driven shaft at the first speed. An idler gear is disposed parallel to the driven shaft and is operable to transmit motion from the driving shaft to rotate the driven shaft at a second different speed when the clutches are in a second state. Structure is connected between the idler gear and one of the shafts for allowing selective variance of the magnitude of the second speed.

RELATED APPLICATIONS

This application discloses an improvement on U.S. patent application Ser. No. 672,249, filed Oct. 2, 1967, now Pat. No. 3,498,424, entitled "Multiple Speed Mechanical Transmission Systems."

FIELD OF THE INVENTION

This invention relates to transmission systems, and more particularly to mechanical transmission systems for press brakes and presses where a pair of different forward speeds may be imparted to a rotating press brake output shaft, with one of the forward speeds being selectively variable.

THE PRIOR ART

Press brake systems are commonly used to form sheets of material into desired shapes. In such press brakes, a male die member, or ram, is reciprocatingly driven into a female mold in order to press the sheet material into the mold shape. In order to keep the ends of the sheet material from "whipping up" during the pressing operation, the operator has been required to stop the ram just before it contacts the work and slip or jog a clutch as the part is being formed. This practice is relatively time consuming and unsafe, and, additionally, the quality of the work product is dependent upon the skill of the operator.

In press brake systems heretofore developed, complex transmission systems using planetary gears and the like have often been used to vary the speed of the rotating drive shaft which drives the ram. These planetary gear systems are relatively complex and expensive, and present installation and maintenance problems. Further, response problems have often arisen with the use of planetary gear systems due to the fact that a plurality of rotating parts have been required to be stopped in order to stop the reciprocating ram. Further, it has not heretofore been practical to install such transmission systems on existing press brakes without a speed changing transmission.

Transmissions for general use have heretofore been developed which vary the speed at which a driving shaft rotates a coaxially aligned driven shaft by the utilization of back-to-back clutches connected between the two shafts, in combination with a geared third shaft disposed parallel to the coaxial line shaft. Disclosures of such transmissions are contained in U.S. Pat. 1,015,639, issued Jan. 23, 1912; U.S. Pat. 1,186,745, issued June 13, 1916; U.S. Pat. 2,320,960, issued June 1, 1949; and U.S. Pat. 2,600,043, issued Dec. 8, 1945.

Such transmissions have not been heretofore adapted for advantageous use with press brake systems, as the additional gearing ofter required for press brakes would render such prior transmission unduly bulky and too complex for practical use. Further, such previously developed transmissions have not been adaptable for use with existing press brakes wherein an add-on transmission is required. Problems have also arisen with such previously developed transmissions due to the requirement of excessively large braking forces to provide adequate braking thereto.

The copending patent application Ser. No. 672,249, filed Oct. 2, 1967, entitled "Multiple Speed Mechanical Transmissions," discloses an improved mechanical transmission for use with press brake and mechanical press systems. This improved transmission provides an automatic speed cycle for a press brake wherein the ram has a relatively fast down speed for a substantial portion of its stroke and then slows to a slow speed for the power pressing portion of the stroke.

However, for different widths of sheet material, it has been found that different slow pressing speeds provide improved results. For instance, the slow press speed should be slightly faster for narrow sheets of material than for wider sheets of material. This is due to the fact that the wider the sheet of material is, the greater danger of "whipping up" of the material edges. The present invention has thus been developed for allowing selective variance of the magnitude of the slow speed of the press brake.

SUMMARY

In accordance with the present invention, a driving shaft is rotated at a first speed and a driven shaft is coaxially aligned with the driving shaft. Clutches having first and second energized states are disposed adjacent the shaft ends, with the clutches operable in the first state to connect the shafts for rotation of said driven shaft at the first speed. An idler gear is disposed parallel to the driven shaft and is operable to rotate the driven shaft at a second speed when the clutches are in the second state. Structure connects the idler gear and one of the shafts for selectively varying the magnitude of the second speed.

In one aspect of the invention, the transmission is disposed within a press brake drive system and includes an output shaft parallel to the idler gear and includes gears for receiving rotating motion from the idler gear. The output shaft is then utilized to drive the press brake.

In another aspect of the invention, the transmission is contained in a casing adapted to be removably connected to a press brake over the input shaft of the press brake. Structure is provided in the casing for keying with the input shaft and a driving shaft is rotated in the casing of the first speed. Structure within the casing is provided for selectively connecting the driving shaft to the input shaft in either of two configurations for selectively rotating the input shaft at either of two different speeds. Structure is also provided within the casing for selectively varying the magnitude of one of the two speeds.

THE DRAWINGS

For a more complete understanding of the present invention, and for further objects and advantages thereof, reference is now made to the following description taken in conjunction with the accompanying drawings, in which:

FIG. 2 is a sectional view of the transmission shown in FIG. 1;

THE PREFERRED EMBODIMENTS

Figure 1:
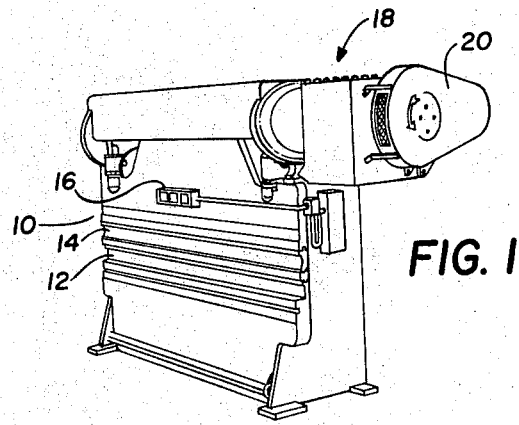
FIG. 1 illustrates a perspective view of a press brake with a hang on transmission according to the present invention attached thereto.

Referring to FIG. 1, a press brake designated generally by the numeral 10 comprises a female mold portion 12 and a vertically reciprocating ram 14. The press brake is shown with the ram 14 in the lowest position. In the up position of the ram 14, a sheet of material may be inserted between the mold 12 and the ram 14. The ram 14 then quickly comes down to within a fraction of an inch of the sheet of material, and then slows to press the sheet material into the mold 12. After pressing of the sheet material, the ram 14 quickly moves up to allow the sheet material to be removed and a new sheet of material to be inserted.

A control box 16 includes run and stop controls. The present transmission illustrated generally by numeral 18 has been added to the conventional press brake to provide automatic speed cycling of the ram. The transmission 18 includes a flywheel cover 20 which encloses a motor driven flywheel which drives a shaft which reciprocates the ram 14.

FIG. 2 illustrates a sectional view of the transmission 18, with the flywheel cover 20 removed. A suitable motor (not shown) drives a flywheel 22 by means of a continuous belt 24. A driving shaft 28 is connected to flywheel 22 by a key 29 and is journaled in bearings 30. An annular seal 32 is disposed about the shaft 28 to retain bearing lubrication. Bearings 30 are retained in place by lock nuts 33 in an annular bore of a support member 34, which is fixedly connected through a main housing wall 36. Support is provided by an annular collar 37 welded to the main housing wall 36.

An end portion 38 of the driving shaft 28 is slightly enlarged in diameter and is connected to a spider 40 by a key 42. A sheave 44 is mounted on the driving shaft 28 and a continuous loop belt or chain 45 passes around the sheave 44 in a manner to be subsequently described in greater detail. Sheave 44 is splined to the shaft 28 so that the sheave 44 rotates with the shaft 28, but so that the opposed wheel faces of the sheave 44 may move relative towards one another along the longitudinal axis of the shaft 28.

The input shaft 46 of an existing press brake system is received by a hollow member 48 and is keyed to member 48 by a key 50. Member 48 is journaled for rotation by bearings 52 which are supported by a block 54 attached to a support wall 56. The other end of the member 48 is journaled by bearings 58 mounted within the spider 40.

A spider 60 is rotatably mounted upon the member 48 by bearings 62. A driven gear 64 is integrally connected to the spider 60. A pair of back-to-back, or duplex clutches 66 and 68 are keyed to the member 48. Outer portions of clutch plates 70 of the clutch 66 are engaged by the spider 40 and normally freely rotate with the spider 40 when in the disengaged state. Outer portions of clutch plates 72 of the clutch 68 engage the spider 60 and normally freely rotate with the spider 60 when in the deenergized state.

Clutches 66 and 68 are selectively energized by lateral movement of an actuator 74 which pivots a member 76 and presses the clutch plates of one of the clutches together in a well-known manner. The actuator 74 may be operated by a suitable lever, not shown, which extends outside the transmission casing. Only one of the clutches 66 and 68 may be engaged at a time. The duplex clutches 66 and 68 may comprise any one of a number of commercially available units, such as the mechanically actuated duplex clutch manufactured and sold as model MTU by the Twin Disc Clutch Company of Racine, Wis.

While a mechanical back-to-back clutch has been illustrated, it will be understood that hydraulically actuated duplex clutches may also be utilized. In such hydraulic clutches, directional valves are utilized to control the direction of fluid flow to one of two duplex clutches to selectively energize one of the clutches. A suitable hydraulically actuated duplex clutch for use with the present invention is manufactured and sold as model BC–607 by the Twin Disc Clutch Company of Racine, Wis. A suitable directional hydraulic valve for control of fluid to the hydraulic clutch is the DG4S4 directional valve manufactured and sold by the Vickers Company.

An intermediate shaft 80 is disposed parallel to the driving shaft 28 and to the coaxially aligned input shaft 46. One end of the intermediate shaft 80 is rotatably mounted within the wall 56 by bearings 82 and at the other end is rotatably mounted in the main housing wall 36 by bearings 84. A gear 86 is attached to the shaft 80 by a key 87. Gear 86 engages the gear 64 which is connected to the spider 60.

A sheave 88 is keyed to the intermediate shaft 80 for rotation therewith. As will be later described in greater detail, sheave 88 is splined to shaft 80 for movement along the axis of rotation of shaft 80. The continuous loop chain 45 passes around sheave 88. A pair of adjustment bars 90 and 92 are threadedly connected to an adjusting screw 94. An adjustment knob 96 extends on the outside of the transmission casing to allow adjustment of the bars 90 and 92. Bars 90 and 92 are connected to the sheave 88 and also to the sheave 44 for adjustment of the effective pitch diameter of the sheaves. Bars 90 and 92 are pivoted on a shaft 98 which is fixedly attached at member 100 to the casing wall 36.

Transmission 18 is encased within a casing having main sidewalls 36, 102 and 104. Pads 106 and 108 are rigidly connected to the casing. The transmission system 18 is thus adapted to be easily attached to the input shaft on an existing press brake system by sliding the casing over the input shaft 46 of the press brake such that the input shaft 46 enters the hollow member 48. Key 50 then attaches the input shaft 46 to the member 48. Pads 106 and 108 are pressed against pads 110 and 112 attached to the wall 114 of the press brake system and bolts 115 and 116 are passed through the pads 106 and 108 to firmly attach the transmission 18 to the press brake in the manner shown in FIG. 1.

In operation of the transmission 18, when it is desired to rotate the input shaft 46 at a relatively high rate of speed, clutch 66 is engaged and the spider 40 directly connects the driving shaft 28 to the member 48. Member 48 is keyed to the input shaft 46, and thus the input shaft 46 is directly rotated by the driving shaft 28 at a high rate of speed. When clutch 66 is energized, clutch 68 is deenergized. Sheave 44 is splined or keyed to the driving shaft 28 and thus rotates the loop 45 to rotate the sheave 88. Rotation of sheave 88 rotates the intermediate shaft 80 and also rotates the gear 86. Gear 86 rotates gear 64 and the spider 60. However, due to the fact that clutch 68 is deenergized, the clutch plates 62 merely spin about to the member 48 and do not impart any rotative motion thereto.

When it is desired to rotate the input shaft 46 at a lower rate of speed, the clutch 66 is deenergized and clutch 68 is energized. Rotative motion is thus imparted through the sheave 44 to the driving member 45 and to the sheave 88. Rotation of sheave 88 rotates intermediate shaft 80 and the gear 86. Rotative motion is thus transmitted from the gear 86 to the gear 64 and to the spider 60. Due to the fact that the clutch 68 is energized, rotative motion is imparted from the spider 60 through the clutch plates 72 to member 48. Shaft 46 is thus rotated at a lower rate of speed due to the gearing introduced by the sheaves 44 and 88 and due to the gearing introduced by the sheaves 44 and 88 and due to the gearing between the gear 86 and gear 64.

Figure 3:
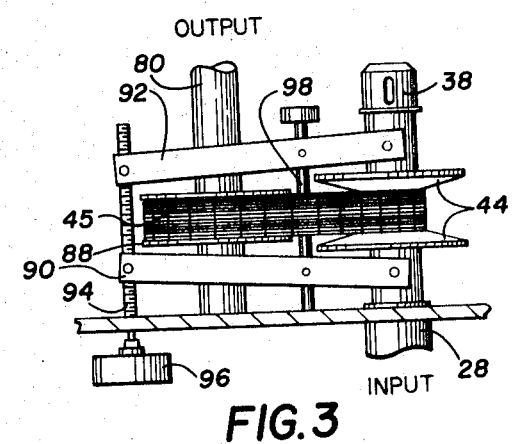
FIG. 3 is a top view of the slow speed varying structure of the transmission shown in FIG. 2.
Figure 4:
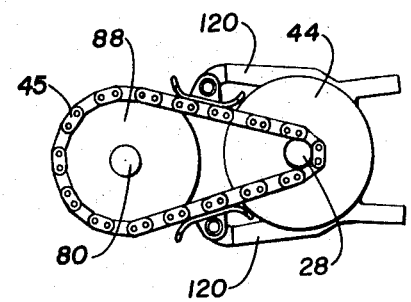
FIG. 4 is a front view of the structure shown in FIG. 3.

As previously mentioned, for various operating conditions, it is often desirable to vary the magnitude of slow speed of the transmission. This is accomplished by rotation of knob 96. The knob 96 may be manually twisted in the desired direction to move the ends of bars 90 and 92 relative to one another. As best shown in FIGS. 3–6, this relative movement of the bars 90 and 92 causes variation of the effective pitch diameter of sheaves 88 and 44 in order to vary the gearing ratio between the sheaves. FIGS. 3 and 4 illustrate the minimum speed setting state for the sheaves 44 and 88. The threaded rod 94 has been rotated such that the ends of the rod 90–92 have been brought relatively close together adjacent the sheave 88, thereby causing the opposed wheel faces of the sheave 88 to be translated toward one another along the shaft 80.

The wheel faces of the sheave 88 have opposed, inwardly sloping faces such that the effective pitch diameter of the sheave is increased as the wheel faces are brought closer together. Thus, in the position shown in FIGS. 3 and 4, the sheave 88 has the largest possible effective pitch diameter about which the driving chain 45 travels. This adjustment of the rod 94 simultaneously causes the ends of the rods 90 and 92 adjacent the sheave 44 to move away from each other along the longitudinal axis of the shaft 28, thereby pulling the opposed wheel faces of the sheave 44 relatively far apart.

Due to the inwardly sloping wheel faces of the sheave 44, this movement causes a relatively small effective pitch diameter to be provided by the sheave 44. As best shown in FIG. 4, a relatively high speed of rotation by the shaft 28 will result in a much slower rotated speed for the shaft 80, due to the gearing provided by the system. It will be understood that the particular control arrangement of the speed variation structure shown allows any speed setting between the maximum and minimum speed states.

In the embodiment shown, the continuous loop chain 45 is made up of a number of packets of slats which are free to move laterally with respect to the center line of the chain 45 and independently of each other. The chain 45 engages in the wheel faces of the sheave, which are radially grooved. The radial grooves are narrower near the center of the wheel face and widen out to the outer edge of the wheel face. Therefore, as the chain 45 comes in contact with the wheel face, the grooves and teeth of the opposing wheel face force the slats of the chain into position to establish a firm mechanical connection between the driving and the driven sheaves in all speed settings. Spring loaded arms 120 are provided to take up any slack in the chain 45 in a particular speed setting of the sheaves.

Figure 5:
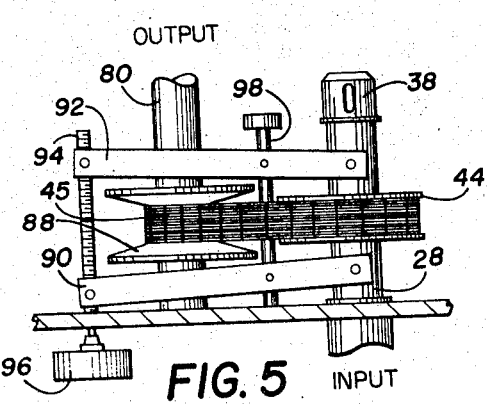
FIG. 5 is a top view of the structure shown in FIG. 3 in a different operating position.
Figure 6:
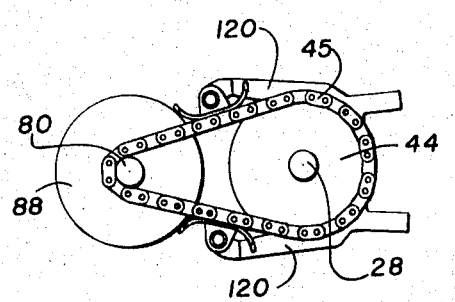
FIG. 6 is a front view of the speed varying structure shown in FIG. 5.

FIGS. 5 and 6 illustrate the speed variation structure of the invention in the maximum speed setting. The rod 94 has been adjusted such that the opposed wheel faces of the sheave 88 are relatively far apart, while the opposed wheel faces of the sheave 44 are relatively close together. Thus, as shown in FIG. 6, effective gearing is provided such that the speed of rotation of the shaft 28 is less than the speed imparted to the shaft 80.

The components of any one of a number of suitable speed-varying structures are suitable for use with the invention. An example of a suitable device is the mechanical transmission system manufactured and sold under the trade name "Specon Vari-Chain" by the Fairchild-Hiller Industrial Products Division, 1501 Fairchild Drive, Winston-Salem, N.C. Alternatively, a suitable transmission operating in a similar manner as that shown in FIGS. 3–6 is manufactured and sold as the Type RS P.I.V. Constant Horespower Variable Speed Drive, manufactured and sold by Link-Belt Company.

Figure 7:
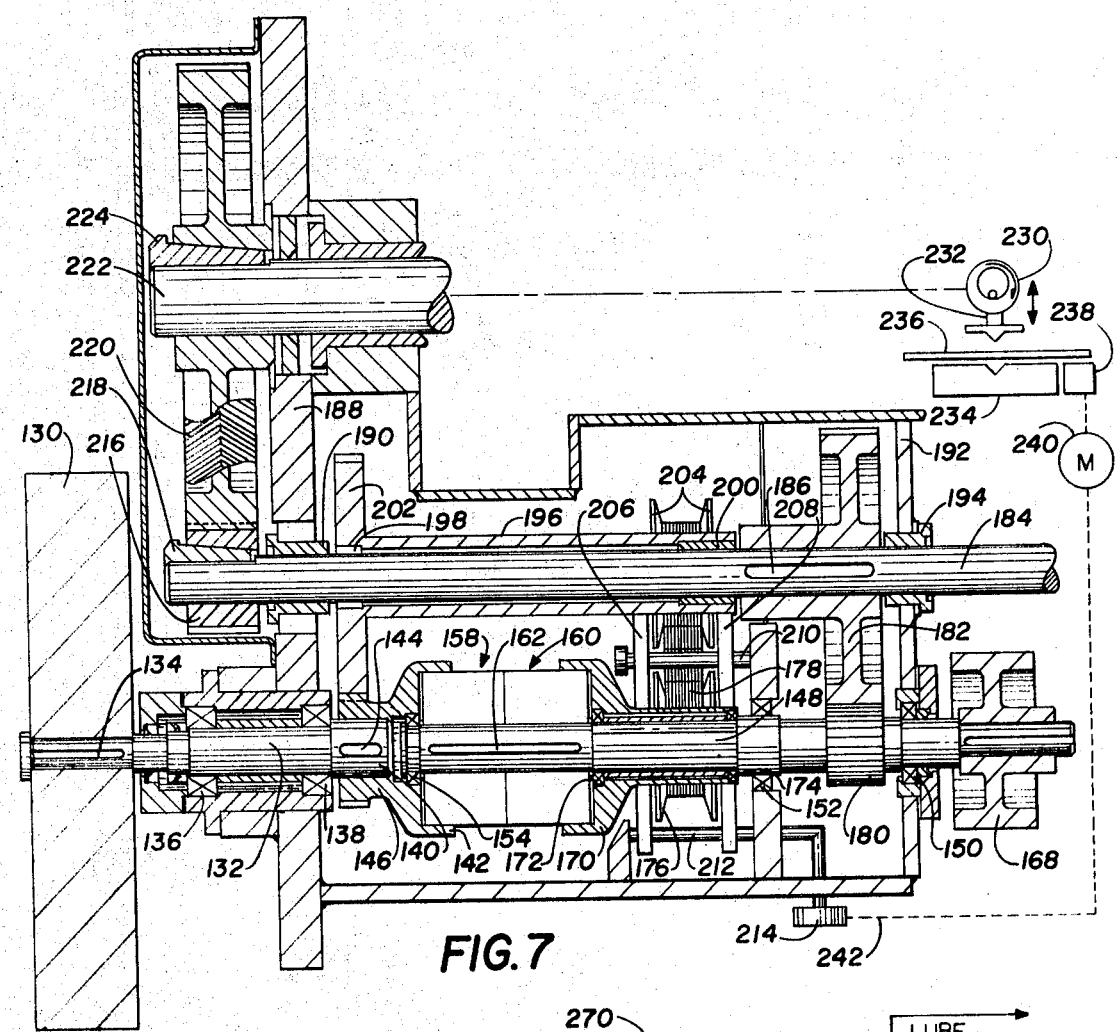
FIG. 7 is a sectional view of a second embodiment of the present transmission.

FIG. 7 illustrates a second embodiment of the present variable speed transmission which is adapted to be built into a press brake. This transmission operates in a similar manner to that shown in FIG. 2, with the excpetion that the variable speed structure is mounted on the driven shaft rather than the driving shaft, and in addition to a novel gearing arrangement. A flywheel 130 is rotated in the conventional manner by a motor driven belt (not shown). A driving shaft 132 is connected to the flywheel by a key 134 and is journaled in bearings 136 and 138. Suitable oil lubrication is provided to rotating parts in the transmission. The end portion 140 of the driving shaft is slightly enlarged in diameter and is connected to a spider 142 by a key 144. The spider includes an integral driving gear 146.

A driven shaft 148 is coaxially aligned with the driving shaft 132 and is journaled at one end by bearings 150 and 152. The end of the driven shaft 148 is journaled in the end of spider 142 by a bearing 154. A pair of back-to-back, or duplex, clutches 158 and 160 are keyed to the driven shaft 148 by a key 162. Clutches 158 and 160 are not illustrated in detail, but may comprise any suitable mechanical or hydraulically actuated clutch such as the clutches previously identified. In practice, a duplex hydraulic clutch manufactured and sold as Model BC–607 by the Twin Disc Company of Racine, Wis., has been found to operate well.

A brake drum 168 is attached to the end of the driven shaft 148. The use of the low inertia duplex clutches 158 and 160 permits the use of a relatively small braking system to brake the rotation of the driven shaft 148. The geometric configuration provided by the present invention enables the bearings for the flywheel 130 to be closely mounted to the flywheel, thus reducing shaft bending.

A spider 170 is rotatably mounted on bearings 172 and 174 about the driven shaft 148. A sheave 176 rotates with spider 170, but such that the opposed wheel faces of the sheave 176 may be moved along the longitudinal axis of the spider 170. A continuous loop driving chain or belt 178 passes around the sheave 176.

Driven shaft 148 includes an integral gear 180 which meshes with a gear 182. Gear 182 is keyed to an intermediate shaft 184 by a key 186. Intermediate shaft 184 is disposed parallel both to the driving shaft 132 and to the driven shaft 148, and is journaled in the outer casing wall 188 by a bearing 190. Shaft 184 is also rotatably journaled in the casing wall 192 by a bearing 194. An idler gear member 196 is rotatably mounted on the intermediate shaft 184 on bearings 198 and 200. The idler gear member 196 includes an integral idler gear 202 which meshes with the gear 146 on spider 142.

A sheave 204 is also splined on the idler gear member 196 in the manner previously described. The continuous loop chain or belt 178 passes about the sheave 204. A pair of parallel adjusting bars 206 and 208 are connected at one end to sheave 176 and at the opposite end to sheave 204. Bars 206 and 208 are each pivoted on a shaft 210. An adjusting rod 212 is threaded to the ends of each of the bars 206 and 208. An adjusting knob 214 allows rotation of the rod 212 through a 90° bend in order to allow adjustment of the bars 206 and 208 to provide variance of the gearing provided by the sheaves 176 and 204 in a manner previously described with respect to FIGS. 3–6.

The intermediate shaft 184 is keyed to a gear 216 by a key 218. Gear 216 meshes with a herringbone gear 220 which is keyed to an output shaft 222 by a key 224. The intermediate shaft 184 may also include another gear at the opposite end of the shaft (not shown) which also serves to drive the output shaft 222. The output shaft 222 is shown diagrammatically connected to drive a press brake by a connection eccentric to the axis of a shaft 230. A die member or ram 232 is pivotally connected to the shaft 230 and is vertically reciprocated upon rotation of shaft 230. The ram 232 is thus periodically forced into a mold 234 in order to shape a work piece of sheet metal 236 into a desired shape. It is, of course, to be understood that, while the preferred embodiment of the invention is particularly advantageous for use with a work piece forming system such as a press brake, the invention may also be used in other varied applications such as stamping presses and shearing systems.

A sensing mechanism 238 is disposed adjacent an edge portion of the sheet of material 236 in order to sense the width of the sheet material. A sensing mechanism 238 generates a signal proportional to the width of the sheet material 236 to a servo motor 240. A servo motor rotates the knob 214 via a suitable connection 242 in accordance with the signals applied by the sensing device 238. Thus, for a sheet of material 236 having a relatively large width, motor 240 adjusts knob 214 in order to drive the press brake at a relatively slow speed during the pressing operation in order to eliminate whipping up of the sheet material.

When the sensing mechanism 238 senses a relatively short width of material, the transmission is adjusted to drive the press brake faster during the press stroke. The sensing mechanism 238 may comprise any one of a number of suitable devices, such as mechanical sensing fingers which are displaced by the edge of the sheet material 236. Alternatively, the sensing mechanism 238 may comprise a series of light sources and electric eyes which are adapted to be blocked off by the edges of the sheet material 236. Other sensing devices, such as magnetic sensors or the like, may also be utilized.

In operation of the transmission of FIG. 7 with a press brake, the flywheel 130 rotates the driving shaft 132 at a constant speed. When it is desired to rotate the shaft 222 at a high rate of speed, clutch 158 is energized and clutch 160 is deenergized. A driving shaft 132 is then directly connected to the driven shaft 148 to thereby rotate the intermediate shaft 184 via the gear 182. Gear 216 rotates the herringbone gear 220 to rotate to the shaft 222 at the desired high rate of speed. The ram 232 is then reciprocally moved at a high rate of speed. As clutch 160 is not engaged, the rotation of the idler gear 196 causes rotation of sheaves 204 and 176 and thereby spider 170, but the spider 170 does not apply torque to the driven shaft 148.

When a lower speed of rotation is desired for the shaft 222, clutch 158 is deenergized and clutch 160 is energized. Rotation is then imparted from the gear 146 to gear 202 in order to rotate the idler gear 196. Sheave 204 is rotated in order to drive the continuous loop chain 178 to rotate the sheave 176. Rotation of sheave 176 causes rotation of the spider 170. Due to the energization of clutch 160, rotation of the spider 170 rotates the driven shaft 148. Motion is then transmitted from the gear 180 to gear 182 in order to rotate the shaft 222 in the manner previously described. This rotation at a rate lower than the rate of rotation imparted by direct drive by the driving shaft 132 is due to the relative gear sizes of the idler gears.

As previously described, rotation of the knob 214 causes adjustment of the bars 206 and 208 in order to vary the magnitude of the slower rate of speed in accordance with desired operating conditions. This adjustment is done directly by the servomotor 240 in accordance with the width of the sheet material 236, or may be done manually by the operator as desired. Because of the novel configuration of the present device, only portions of the device continuously rotate and thus only relatively small braking forces are required to provide adequate braking for the driven shaft 148. Additionally, because the idler gear member 196 and the intermediate shaft 184 rotate relative to one another, a bulky arrangement of additional driving gears is not required by the transmission.

The use of the sheet width sensing system of the invention provides a generally constant speed of "whip-up" of the ends of various sheet sizes during pressing operations. In other words, the insertion of a short sheet causes the press to run faster than the insertion of a wide sheet, thereby causing the ends of both the sheets to "whip-up" or rise at about the same rate. This constant rate of "whip-up" reduces possible operator injuries and increases productivity.

Figure 8:
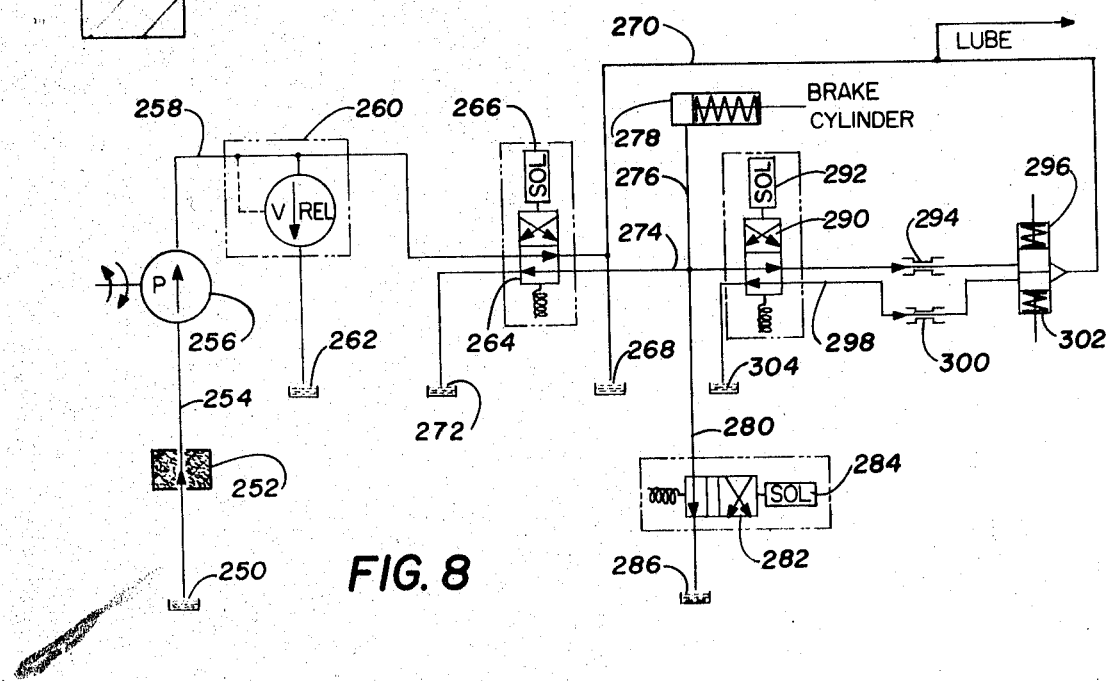
FIG. 8 is a schematic view of a hydraulic actuation circuit for the present transmission.

FIG. 8 illustrates a hydraulic circuit particularly adapted for selective actuation and lubrication of the present transmission system when used on a press brake. A main reservoir 250 of hydraulic fluid is equipped with a suitable oil strainer 252 to provide hydraulic fluid through a line 254 to a constant delivery, reversing gear-type pump 256. Pump 256 may be operated by the flywheel of the transmission to provide a constant supply of hydraulic fluid through line 258 to a relief valve 260. Relief valve 260 dumps hydraulic fluid to a reservoir 262 when the fluid pressure rises above a preselected level.

Hydraulic fluid is supplied through the line 258 to a two-position, four-way valve 264. Solenoid 266 controls the operation of valve 264. In the illustrated position of the valve 264, hydraulic fluid is provided through the line 258 to the drain reservoir 268 and to a lube line 270 for lubrication of the clutches and for other parts of the present transmission. A return reservoir 272 receives hydraulic fluid draining from a line 274. A line 276 supplies fluid to a brake cylinder 278. A line 280 supplies fluid to a second two-position, four-way valve 282 which is controlled by solenoid 284. In the illustrated position of the valve 282, fluid drains into a reservoir 286. Line 274 supplies fluid to a two-position, four-way valve 290 which is operated by a solenoid 292. In the illustrated position of the valve 290, fluid is supplied through the line 274 through a flow-control valve 294 to a first duplex clutch 296. A line 298 communicates via a flow-control valve 300 to a second duplex clutch 302. Line 298 passes through the valve 290 for communication with a reservoir 304.

In operation of the hydraulic circuit of FIG. 8, a run-button (not shown) is manually pushed in order to actuate each of the three solenoids 266, 284, and 292. The operation of solenoid 266 supplies hydraulic fluid via line 258 to line 274 in order to release the brake cylinder 278. The actuation of solenoid 284 blocks the flow of fluid via line 280 to the reservoir 286. The actuation of solenoid 292 supplies fluid via line 298 to operate clutch 302 in order to operate the press brake at a high speed during its downward stroke.

When the press brake ram hits a limit switch which is positioned near the work piece, the solenoid 292 is deenergized to change the position of the valve 290. Fluid is then supplied via the flow-control valve 294 to clutch 296 in order to operate the ram at a slow speed. Fluid then drains from clutch 302 via line 298 to the reservoir 304. When the ram reaches its lowest position, a limit switch again operates the solenoid 292 in order to energize clutch 302 and to deenergize clutch 296 in order to return the ram to its upper position at a high rate of speed. When the ram gets to the top of its stroke, a suitable limit switch deenergizes each of the solenoids 266, 284, and 292 in order to stop operation of the press brake until the next sheet of material is properly positioned. The brake cylinder is spring clamped to hold the press brake ram at the upper position until the next stroke is desired.

Whereas the present invention has been described with respect to several specific embodiments thereof, it is to be understood that further modifications and changes would be suggested to one skilled in the art and it is intended to cover such modifications and changes as fall within the scope of the appended claims.

What is claimed is:

1. A plural speed transmission system comprising:
   (a) a driving shaft rotatable at a first speed and including a driving gear mounted on an end portion thereof,
   (b) a driven shaft coaxially aligned with said driving shaft and including a driven gear mounted thereon,
   (c) clutch means having two operating states connected adjacent the end of said shafts,
   (d) an intermediate shaft disposed parallel to said shafts and including gear means for receiving rotative motion from said driven shaft,
   (e) idler gear means rotatably mounted on said intermediate shaft and engaging one of said driving and driven gears,
   (f) means for changing the operating state of said clutch, whereby in one of said operating states said driven shaft is directly coupled to said driving shaft for rotation at a first speed and in the other of said operating states rotative motion is transmitted from said driving shaft through said idler gear means for rotation of said driven shaft at a second speed, and
   (g) means disposed between said idler gear means and one of said driving and driven gears and operable to provide selective variance of said second speed.

2. The transmission system of claim 1 wherein said clutch means comprises an output shaft disposed parallel to said intermediate shaft and including gearing means for receiving rotative motion from said intermediate shaft.

3. The transmission system of claim 1 wherein said clutch means comprises first and second adjacently disposed clutches, each adapted to engage one of said shafts.

4. The transmission system of claim 3 and further comprising:
   a first spider gear rigidly connected to said driving shaft and operable in dependence on said first clutch to rotate said driven shaft at said first speed, and
   a second spider gear rotatably mounted on said driven shaft and operable in dependence on said second clutch to rotate said driven shaft at said second speed.

5. The transmission system of claim 1 wherein said means operable to provide selective variance of said second speed comprises:
   a first sheave having a variable effective pitch diameter mounted for rotation with said idler gear means,
   a second sheave having a variable effective pitch diameter mounted for rotation with one of said shafts,
   a continuous driving loop passing around said first and second sheaves for transferring rotative motion between said idler gear means and said one of said shafts, and
   means for concurrently increasing the effective pitch diameter of one of said sheaves while decreasing the effective pitch diameter of the other of said sheaves for varying said second speed.

References Cited

UNITED STATES PATENTS

| | | | |
|---|---|---|---|
| 2,567,603 | 9/1951 | Hogue | 192—87UX |
| 2,912,084 | 11/1959 | Meyercordt | 192—12 |
| 2,975,643 | 3/1961 | Ferguson | 74—360UX |
| 2,983,348 | 5/1961 | Ott | 74—364X |
| 2,998,732 | 9/1961 | Nelson | 74—364 |
| 3,016,722 | 1/1962 | Batdorf | 74—360UX |
| 3,097,540 | 7/1963 | Berens | 74-230.17 |
| 3,441,114 | 4/1969 | Pensa | 74—411.5X |

JAMES A. WONG, Primary Examiner

U.S. Cl. X.R.

74—218, 230.17, 364; 192—4, 87.1